United States Patent
Kitamura

(10) Patent No.: US 8,405,892 B2
(45) Date of Patent: Mar. 26, 2013

(54) METHOD AND DEVICE FOR MANUFACTURING A HOLOGRAM RECORDING MEDIUM IN WHICH DIFFERENT ORIGINAL IMAGES ARE REPRODUCED WHEN OBSERVED FROM DIFFERENT POSITIONS

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/313,308

(22) Filed: Dec. 7, 2011

(65) Prior Publication Data

US 2012/0206780 A1 Aug. 16, 2012

Related U.S. Application Data

(62) Division of application No. 11/811,599, filed on Jun. 11, 2007, now Pat. No. 8,107,144.

(30) Foreign Application Priority Data

Jun. 14, 2006 (JP) ................................ 2006-164332

(51) Int. Cl.
*G03H 1/08* (2006.01)
(52) U.S. Cl. ................. 359/9; 359/22; 359/32
(58) Field of Classification Search ........................ 359/9
See application file for complete search history.

(56) References Cited

U.S. PATENT DOCUMENTS

| | | | |
|---|---|---|---|
| 3,832,027 A | 8/1974 | King | |
| 5,784,200 A | 7/1998 | Modegi | |
| 6,618,190 B2 | 9/2003 | Kitamura et al. | |
| 6,813,048 B2 | 11/2004 | Kitamura | |
| 6,934,074 B2 | 8/2005 | Kitamura et al. | |
| 7,221,496 B2 | 5/2007 | Kitamura | |
| 7,489,435 B2 | 2/2009 | Kitamura | |
| 7,492,498 B2 | 2/2009 | Kitamura | |
| 7,492,499 B2 | 2/2009 | Kitamura | |
| 7,492,500 B2 | 2/2009 | Kitamura | |
| 7,492,501 B2 | 2/2009 | Kitamura | |
| 7,573,622 B2 | 8/2009 | Kitamura | |
| 7,580,170 B2 * | 8/2009 | Tanaka et al. | 359/9 |
| 7,706,038 B2 | 4/2010 | Kitamura | |
| 7,999,981 B2 | 8/2011 | Kitamura | |
| 8,045,267 B2 | 10/2011 | Kitamura | |
| 8,107,144 B2 * | 1/2012 | Kitamura | 359/9 |
| 2007/0216978 A1 | 9/2007 | Kitamura | |
| 2008/0239423 A1 | 10/2008 | Kitamura | |

FOREIGN PATENT DOCUMENTS

| | | |
|---|---|---|
| JP | 11-155151 A | 6/1999 |
| JP | 2001-109362 A | 4/2001 |
| JP | 2002-72837 A | 3/2002 |
| JP | 2006-65340 A | 3/2006 |

OTHER PUBLICATIONS

Non-English Action from the Japanese Patent Office in respect of counterpart Japanese Application No. 2006-164332 and an English-language version.
U.S. Appl. No. 13/236,123, filed Sep. 19, 2001.

* cited by examiner

*Primary Examiner* — Arnel C Lavarias
(74) *Attorney, Agent, or Firm* — Ladas & Parry LLP

(57) ABSTRACT

A method and device for manufacturing a hologram recording medium. Arrangements are made to enable different original images to be reproduced upon observation from different positions and yet enable reproduced images of high resolution to be obtained.

14 Claims, 9 Drawing Sheets

METHOD AND DEVICE FOR MANUFACTURING A HOLOGRAM RECORDING MEDIUM IN WHICH DIFFERENT ORIGINAL IMAGES ARE REPRODUCED WHEN OBSERVED FROM DIFFERENT POSITIONS

CROSS-REFERENCE TO RELATED APPLICATIONS

This application is a divisional of U.S. patent application Ser. No. 11/811,599 filed Jun. 11, 2007, now U.S. Pat. No. 8,107,144 which claimed the benefit of Japanese Patent Application: 2006/164332 filed Jun. 14, 2006, the contents of which are incorporated herein by reference.

BACKGROUND OF THE INVENTION

The present invention relates to a method and a device for manufacturing a hologram recording medium and particularly relates to arts for manufacturing a hologram recording medium that is arranged to reproduce different original images when observed from different positions.

Holograms have come to be widely used in applications for preventing counterfeiting of cash vouchers and credit cards. Normally, a region onto which a hologram is to be recorded is set up in a portion of a medium to be subject to counterfeiting prevention, and a hologram of a three-dimensional image, etc., is recorded inside this region.

With many holograms that are currently utilized commercially, an original image is recorded onto a medium in the form of interference fringes by an optical method. That is, a method is employed in which an object that forms an original image is prepared and light from the object and a reference light are guided by a lens or other optical system to a recording surface, coated with a photosensitizing agent, to form interference fringes on the recording surface. Although this optical method requires an optical system of considerably high precision to obtain a clear image, it is the most direct method for obtaining a hologram and is the most widely practiced method in industry.

Meanwhile, methods for preparing a hologram by forming interference fringes on a recording surface by computation using a computer have come to be known recently, and a hologram prepared by such a method is generally referred to as a "computer generated hologram (CGH)" or simply as a "computer hologram." A computer hologram is obtained by simulating an optical interference fringe generating process on a computer, and an entire process of generating an interference fringe pattern is carried out in the form of computation on the computer. Upon obtaining image data of an interference fringe pattern by such a computation, physical interference fringes are formed on an actual medium based on the image data. As a specific example, a method, with which image data of an interference fringe pattern prepared by a computer are provided to an electron beam printer and physical interference fringes are formed by scanning an electron beam across a medium, has been put to practical use.

With a hologram recording medium, an original image can be recorded three-dimensionally and the original image can be observed from different angles by changing the viewpoint position. Thus, a major characteristic of a hologram recording medium is that a three-dimensional image can be recorded on a flat surface. Also, recently, hologram recording media, with a further characteristic that a completely different original image is reproduced when observed from a different angle, are being utilized commercially. For example, Japanese Patent Laid-open Publication No. 2001-109362A discloses a method that employs a computer generating hologram method to manufacture a hologram recording medium with which different original images can be reproduced by changing the viewpoint position.

As mentioned above, methods for manufacturing a hologram recording medium, with which different original images can be reproduced when observed from different positions, are already as known as conventional arts. However, because the basic principle of the conventional methods is to set up a plurality of regions on a hologram recording surface and record a different original image on each individual region, there is the problem that the reproduced images are lowered in resolution.

For example, the abovementioned Patent Document discloses a method in which a hologram recording surface is partitioned into a plurality of strip-like regions, each strip-like region is associated with one original image among a plurality of mutually different original images, and on a single strip-like region, only the one original image that is associated with the strip-like region is recorded. Specifically, in a case where three original images are to be recorded, a recording method is employed in which a first original image is recorded on a 1st, 4th, 7th, 10th strip-like regions, etc., a second original image is recorded on a 2nd, 5th, 8th, 11th strip-like regions, etc., and a third original image is recorded on a 3rd, 6th, 9th, 12th strip-like regions, etc. In this case, each of the three original images is recorded in the form of interference fringes and by differing the direction of the reference light according to each original image in this process, a specific original image is made to be reproduced upon observation from a specific position.

However with the above example, because, for example, the first original image is recorded only on the 1st, 4th, 7th, 10th strip-like regions, etc., and information on the first original image are left out from the 2nd, 3rd, 5th, 6th, 8th, 9th, 11th, 12th strip-like regions, etc., the resolution of the reproduced image is reduced to ⅓ that of the original. Thus, as long as the principle of recording a different original image on each individual region is employed, the problem of lowering the resolution of the reproduced image occurs.

SUMMARY OF THE INVENTION

Thus, an object of the present invention is to provide a method and a device for manufacturing a hologram recording medium, with which different original images are reproduced when observed from different positions and yet with which reproduced images of high resolution can be obtained.

(1) The first feature of the invention resides in a method for manufacturing a hologram recording medium that has an arrangement by which different original images are reproduced when observed from different positions, the hologram recording medium manufacturing method comprising:

an original image preparation step of preparing a plurality N of original images, each as a set of unit light sources positioned in a three-dimensional coordinate system;

a recording plane setting step of setting a predetermined recording plane in the three-dimensional coordinate system;

a reference light setting step of setting a predetermined reference light in the three-dimensional coordinate system;

an observation region setting step of setting a plurality N of observation regions in the three-dimensional coordinate system;

a pattern computation step of computing an interference fringe pattern, formed on the recording plane, based on object light components, emitted from the individual unit light sources constituting the respective original images, and the reference light; and a pattern forming step of forming the interference fringe pattern on a physical medium; and wherein in the pattern computation step, computations that each takes into account only light components, which, among the object light components from the unit light sources belonging to an i-th (i=1, 2, ..., N) original image, reach an i-th (i=1, 2, ..., N) observation region, are performed.

(2) The second feature of the invention resides in a hologram recording medium manufacturing method according to the first feature, wherein in the pattern computation step, a synthetic object light is determined by synthesizing the object light components emitted from the individual unit light sources constituting the respective original images, and an interference fringe pattern that is obtained on the recording plane by interference of the synthetic object light and the reference light is computed.

(3) The third feature of the invention resides in a hologram recording medium manufacturing method according to the first or second feature, wherein in the pattern forming step, the interference fringe pattern, obtained by the pattern computation step, is converted into a binary image pattern and the binary image pattern is formed on a physical medium.

(4) The fourth feature of the invention resides in a method for manufacturing a hologram recording medium that has an arrangement by which different original images are reproduced when observed from different positions, the hologram recording medium manufacturing method comprising:

an original image preparation step of preparing a plurality N of original images, each as a set of unit light sources positioned in a three-dimensional coordinate system;

a recording plane setting step of setting a predetermined recording plane in the three-dimensional coordinate system;

an observation region setting step of setting a plurality N of observation regions in the three-dimensional coordinate system;

a pattern computation step of computing a complex amplitude pattern formed on the recording plane by synthesis of object light components emitted from the individual unit light sources constituting the respective original images; and a pattern forming step of forming the complex amplitude pattern on a physical medium; and wherein in the pattern computation step, computations that each takes into account only light components, which, among the object light components from the unit light sources belonging to an i-th (i=1, 2, ..., N) original image, reach an i-th (i=1, 2, ..., N) observation region, are performed.

(5) The fifth feature of the invention resides in a hologram recording medium manufacturing method according to the fourth feature, wherein in the pattern computation step, a plurality of computation points are defined discretely on the recording plane and an amplitude and a phase of a synthetic object light at a predetermined sampling time point is determined for each of computation point positions to determine the complex amplitude pattern as a discrete distribution of amplitudes and phases.

(6) The sixth feature of the invention resides in a hologram recording medium manufacturing method according to the fifth feature, wherein in the pattern forming step, a cell, formed of a three-dimensional structure, is positioned at each individual computation position and information of an amplitude and a phase concerning the computation point position corresponding to each individual cell are recorded in the three-dimensional structure of the cell.

(7) The seventh feature of the invention resides in a hologram recording medium manufacturing method according to the first to sixth features, wherein in the original image preparation step, a plurality of original images that are positioned so as to partially overlap spatially are prepared.

(8) The eighth feature of the invention resides in a hologram recording medium manufacturing method according to the first to seventh features, wherein in the observation region setting step, the plurality N of observation regions are set to be regions that are spatially exclusive with respect to each other.

(9) The ninth feature of the invention resides in a hologram recording medium manufacturing method according to the first to seventh features, wherein in the observation region setting step, a portion or all of the plurality N of observation regions are set to be regions that partially overlap spatially with another observation region.

(10) The tenth feature of the invention resides in a hologram recording medium manufacturing method according to the first to seventh features, wherein in the observation region setting step, a portion or all of the plurality N of observation regions are set to be regions that spatially match another observation region completely.

(11) The eleventh feature of the invention resides in a hologram recording medium manufacturing method according to the first to tenth features, wherein point light sources or collections of point light sources are used as the unit light sources, and the object light is defined as a spherical wave that is emitted radially from each point light source or as a synthetic wave of such spherical waves.

(12) The twelfth feature of the invention resides in a hologram recording medium manufacturing method according to the first to tenth features, wherein segment light sources are used as unit light sources, and object light components, each with a wavefront formed of a side surface of a cylindrical column having a segment light source as a central axis, which propagate in a direction perpendicular to the central axis, are defined.

(13) The thirteenth feature of the invention resides in a hologram recording medium manufacturing method according to the first to twelfth features, wherein in the observation region setting step, each individual observation region is set as a plane, a curved surface, or a three-dimensional body in the three-dimensional coordinate system.

(14) The fourteenth feature of the invention resides in a hologram recording medium manufacturing method according to the first to thirteenth features, wherein in the pattern computation step, the computation is performed upon partitioning the three-dimensional space into a plurality M of plate-like spaces by slicing by a plurality of mutually parallel planes and by taking into account only light components, which, among the object light components from the unit light sources in a j-th (j=1, 2, ..., M) plate-like space and belonging to an i-th (i=1, 2, ..., N) original image, reach an i-th (i=1, 2, ..., N) observation region and reach the recording plane only through an interior of the j-th (j=1, 2, ..., M) plate-like space.

(15) The fifteenth feature of the invention resides in a method for manufacturing a hologram recording medium that has an arrangement by which different original images are reproduced when observed from different positions, the hologram recording medium manufacturing method comprising:

an original image preparation step of preparing a plurality of original images, each as a set of unit light sources positioned in a three-dimensional coordinate system;

a recording plane setting step of setting a predetermined recording plane in the three-dimensional coordinate system;

a reference light setting step of setting a predetermined reference light in the three-dimensional coordinate system;

an observation region setting step of setting a plurality of observation regions in the three-dimensional coordinate system;

a pattern computation step of computing an interference fringe pattern, formed on the recording plane, based on object light components, emitted from the individual unit light sources constituting the respective original images, and the reference light; and a pattern forming step of forming the interference fringe pattern on a physical medium; and wherein in the pattern computation step, computations that each takes into account only light components, which, among the object light components from the unit light sources, propagate toward a unique observation region set in accordance with the original image to which the unit light sources belong, are performed.

(16) The sixteenth feature of the invention resides in a method for manufacturing a hologram recording medium that has an arrangement by which different original images are reproduced when observed from different positions, the hologram recording medium manufacturing method comprising:

an original image preparation step of preparing a plurality of original images, each as a set of unit light sources positioned in a three-dimensional coordinate system;

a recording plane setting step of setting a predetermined recording plane in the three-dimensional coordinate system;

an observation region setting step of setting a plurality of observation regions in the three-dimensional coordinate system;

a pattern computation step of computing a complex amplitude pattern formed on the recording plane by synthesis of object light components emitted from the individual unit light sources constituting the respective original images; and a pattern forming step of forming the complex amplitude pattern on a physical medium; and wherein in the pattern computation step, computations that each takes into account only light components, which, among the object light components from the unit light sources, propagate toward a unique observation region set in accordance with the original image to which the unit light sources belong, are performed.

(17) The seventeenth feature of the invention resides in a hologram recording medium which is manufactured by the manufacturing method according to the first to sixteenth features.

(18) The eighteenth feature of the invention resides in a device for manufacturing a hologram recording medium that has an arrangement by which different original images are reproduced when observed from different positions, the hologram recording medium manufacturing device comprising:

an original image storage unit, storing a plurality N of original images, each as data indicating a set of unit light sources positioned in a three-dimensional coordinate system;

a recording plane setting unit, setting a predetermined recording plane in the three-dimensional coordinate system;

a reference light setting unit, setting a predetermined reference light in the three-dimensional coordinate system;

an observation region setting unit, setting a plurality N of observation regions in the three-dimensional coordinate system;

a pattern computation unit, computing an interference fringe pattern, formed on the recording plane, based on object light components, emitted from the individual unit light sources constituting the respective original images, and the reference light; and a pattern forming unit, forming an interference fringe pattern on a physical medium; and wherein the pattern computation unit performs computations that each takes into account only light components, which, among the object light components emitted from the unit light sources belonging to an i-th (i=1, 2, ..., N) original image, reach an i-th (i=1, 2, ..., N) observation region.

(19) The nineteenth feature of the invention resides in a device for manufacturing a hologram recording medium that has an arrangement by which different original images are reproduced when observed from different positions, the hologram recording medium manufacturing device comprising:

an original image storage unit, storing a plurality N of original images, each as data indicating a set of unit light sources positioned in a three-dimensional coordinate system;

a recording plane setting unit, setting a predetermined recording plane in the three-dimensional coordinate system;

an observation region setting unit, setting a plurality N of observation regions in the three-dimensional coordinate system;

a pattern computation unit, computing a complex amplitude pattern formed on the recording plane by synthesis of object light components emitted from the individual unit light sources constituting the respective original images; and a pattern forming unit, forming the complex amplitude pattern on a physical medium; and wherein the pattern computation unit performs computations that each takes into account only light components, which, among the object light components emitted from the unit light sources belonging to an i-th (i=1, 2, ..., N) original image, reach an i-th (i=1, 2, ..., N) observation region.

(20) The twentieth feature of the invention resides in a program that makes a computer function as the original image storage unit, the recording plane setting unit, the reference light setting unit, the observation region setting unit, and the pattern computation unit of the hologram recording medium manufacturing device according to the eighteenth feature or a program that makes a computer function as the original image storage unit, the recording plane setting unit, the observation region setting unit, and the pattern computation unit of the hologram recording medium manufacturing device according to the nineteenth feature.

DESCRIPTION OF THE PREFERRED EMBODIMENTS

The present invention shall now be described based on the illustrated embodiments.

Section 1. Basic Embodiment of the Present Invention

Figure 1:
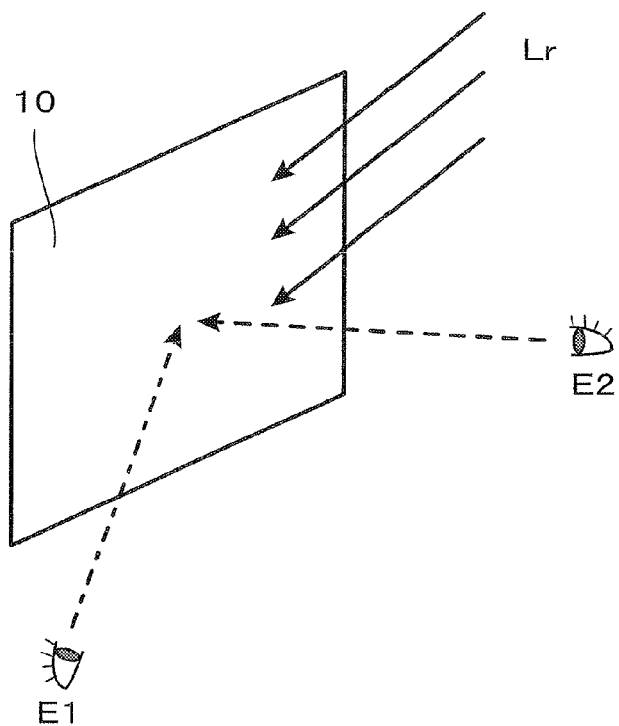
FIG. 1 is a perspective view of modes of observing a hologram recording medium manufactured by a method according to the present invention.

A hologram recording medium manufacturing method according to the present invention shall first be described based on a basic embodiment. FIG. 1 is a perspective view of modes of observing a hologram recording medium 10 manufactured by the method according to the present invention. The hologram recording medium 10 shown here as an example is a reflection type recording medium and as illustrated, a reproduction image is obtained by observation from a front side while a reproduction illumination light Lr is illuminated from the front side. The hologram recording medium has the characteristic that mutually different reproduction images are observed upon observation from a viewpoint E1 and upon observation from a viewpoint E2. As a matter of course, the method according to the present invention is not restricted to the manufacture of a reflection type recording medium, and a transmission type recording medium, with which observation is performed from the front side while the reproduction illumination light Lr is illuminated from the back side, can also be prepared.

Figure 2A:
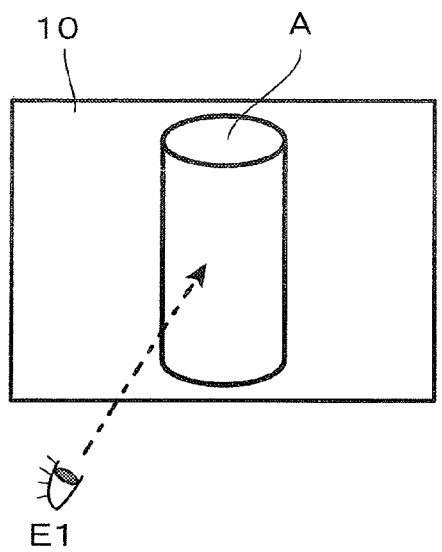
FIGS. 2A and 2B show plan views of two modes of observing the hologram recording medium shown in FIG. 1.
Figure 2B:
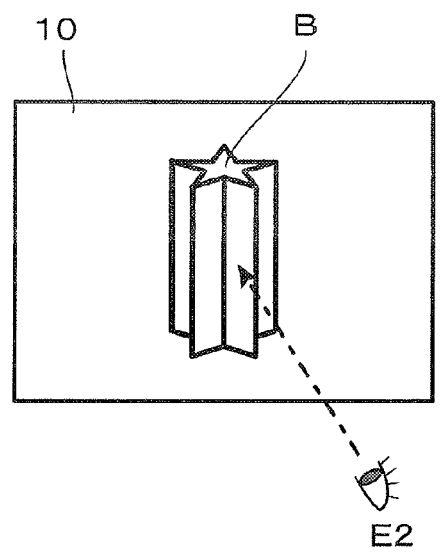

With the specific example shown here, whereas upon observation from the viewpoint E1, a first reproduction image A (an image of a cylindrical column in the present example) is obtained as shown in FIG. 2A, upon observation from the viewpoint E2, a second reproduction image B (an image of a star-shaped column in the present example) is obtained as shown in FIG. 2B. That is, two different original images are overlappingly recorded on the recording medium 10, and mutually different original images are reproduced according to the observation position. As a matter of course, the recording medium 10 can be observed from a position besides the viewpoint E1 and the viewpoint E2 and in such a case, only the first reproduction image A is observed, or only the second reproduction image B is observed, or both reproduction images are observed in a state of being blended at predetermined proportions, in other words, the observation modes vary according to position.

Methods for preparing such a hologram recording medium with the characteristic that different original images are reproduced upon observation from different positions are known as disclosed in the abovementioned Patent Document. However, because as mentioned above, a basic principle of the conventional methods is to set up a plurality of regions on a hologram recording plane and record a different original image on each individual region, there is the problem that the reproduced images are lowered in resolution, and the present invention proposes a new method that resolves this problem.

Figure 3:
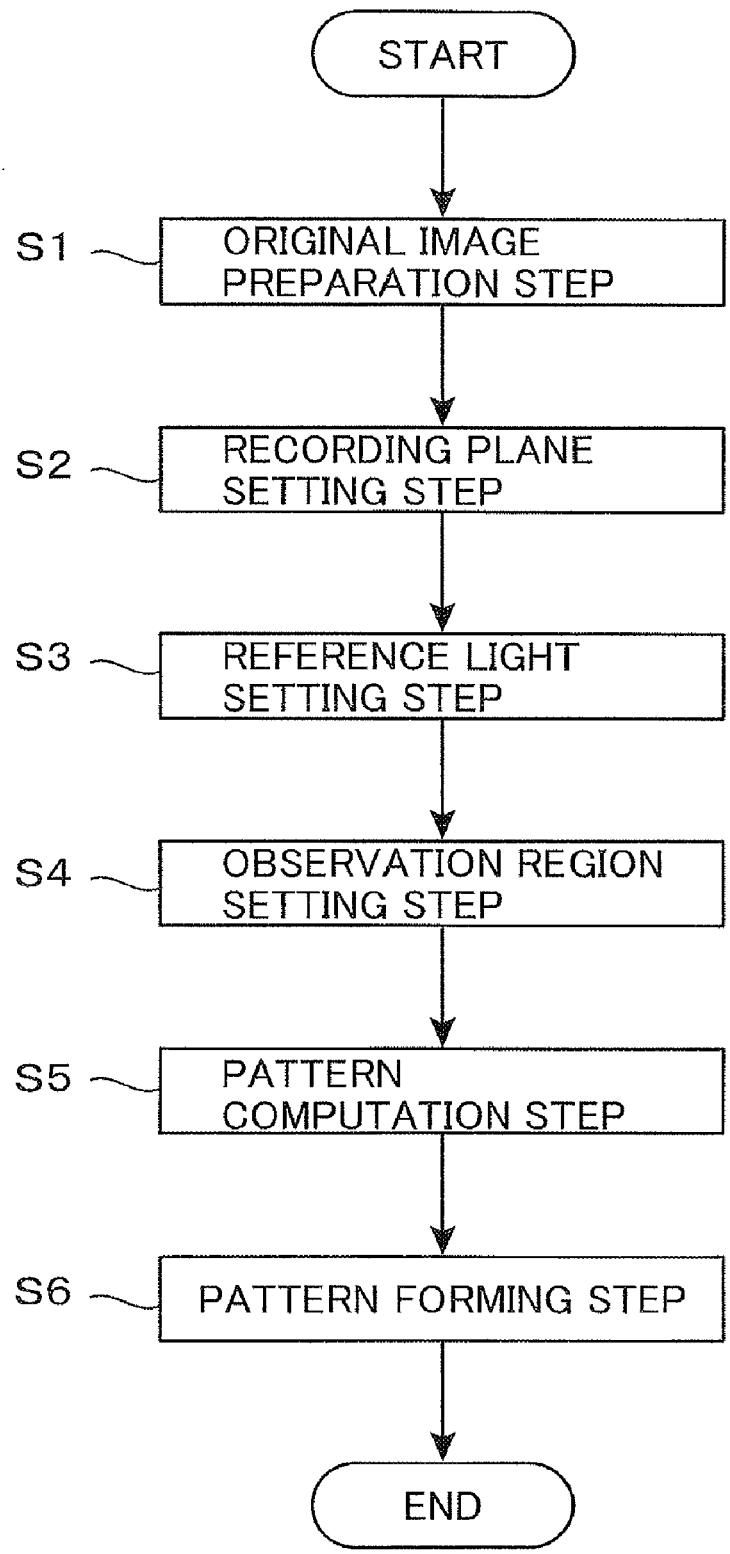
FIG. 3 is a flowchart of a basic procedure of the hologram recording medium manufacturing method according to the present invention.

FIG. 3 is a flowchart of a basic procedure of the hologram recording medium manufacturing method according to the present invention. The basic embodiment of the present invention shall now be described in line with this basic procedure. The flowchart of FIG. 3 illustrates a process for manufacturing a hologram recording medium by a "computer generated hologram (CGH)" method and the procedures of steps S1 to S5 are all procedures that are executed by a computer. A physical hologram recording medium is formed in a final, pattern forming step of step S6.

First, in an original image preparation step of step S1, a plurality N of original images are respectively prepared as a set of unit light sources positioned in a three-dimensional coordinate system. To prepare a recording medium that can reproduce the two reproduction images A and B as in the example of FIG. 2's, two original images are prepared in step S1. Thus although in the description that follows, an example where N=2, that is, an example of a process of preparing two original images and manufacturing the hologram recording medium 10 shown in FIG. 2's shall be described for the sake of convenience, the present invention can obviously be applied to cases of N=3 or more.

Figure 4A:
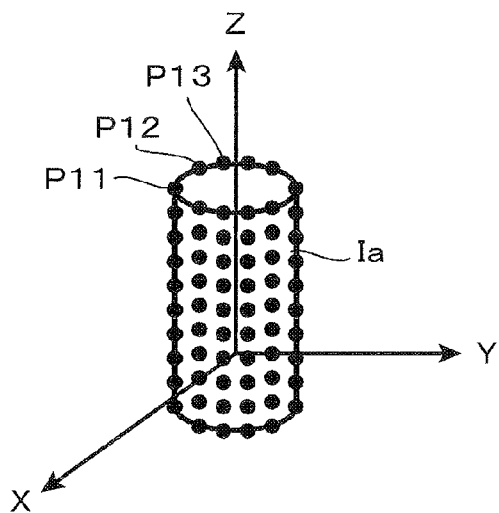
FIGS. 4A and 4B show perspective views of an example of two original images prepared in "S1: Original image preparation step" in the flowchart of FIG. 3.
Figure 4B:
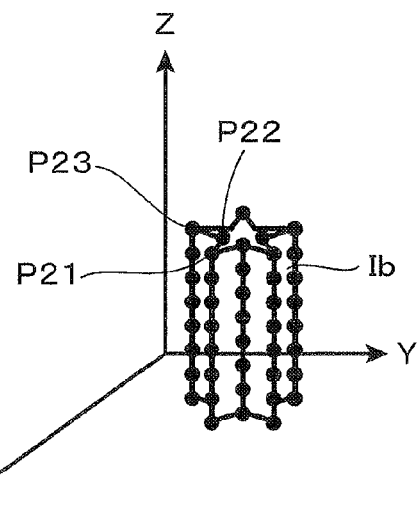

In a general computer generated hologram method, an optical interference fringe generation process is simulated on a computer. Thus here, an XYZ orthogonal coordinate system is defined as a three-dimensional coordinate system in which the optical simulation is performed. FIG. 4's show perspective views of an example of two original images defined in the XYZ coordinate system. FIG. 4A shows a first original image Ia, and FIG. 4B shows a second original image Ib. The first original image Ia of cylindrical columnar shape, shown in FIG. 4A, is the source of the first reproduction image A, shown in FIG. 2A, and the second original image Ib of star-shaped columnar shape, shown in FIG. 4B, is the source of the second reproduction image B, shown in FIG. 2B.

As shown in FIG. 4's, each of the original images Ia and Ib is constituted of a plurality of unit light sources that are positioned in the XYZ coordinate system. Here, it shall be deemed that each unit light source is constituted from a point light sources. The respective point light sources are indicated in FIG. 4's as black dots (such as P11, P12, P13, P21, P22, and P23). Although examples in which the point light sources are positioned sparsely are shown in the figures for the sake of description, in actuality, the point light sources are defined at a higher density in order to prepare original images of higher resolution.

Although in the figures, the first original image Ia is shown in FIG. 4A, the second original image Ib is shown in FIG. 4B, and the two are drawn separately, the two original images Ia and Ib are three-dimensional images defined in the same XYZ coordinate system, and with the present example, the two are positioned so as to overlap partially. As shown in the observation modes of FIG. 2's, because mutually different original images are reproduced from the hologram recording medium 10 according to the viewpoint position of observation, there is no problem whatsoever even if the plurality of the original images prepared in the original image preparation step S1 are positioned so as to partially overlap spatially.

Obviously the respective original images Ia and Ib are images defined on a computer and the actual entities thereof are digital image data. The original image preparation step of step S1 is thus actually a process of preparing original images Ia and Ib, constituted of digital image data, inside a storage unit of a computer. Although in the illustrated example, both of the original images Ia and Ib are images with three-dimensional shapes, the original images prepared in the present invention do not necessarily have to be three-dimensional images and planar images (such as character strings positioned in a two-dimensional plane) may be used as original images as well.

Meanwhile, in a recording plane setting step of step S2, a predetermined recording plane 20 is set in the XYZ three-dimensional coordinate system, and in a reference light setting step of step S3 that follows, a predetermined reference light R is set in the XYZ three-dimensional coordinate system. The recording plane 20 is a plane that corresponds to the recording surface of the hologram recording medium 10 that is to be the final product and is normally set up as a flat surface of rectangular shape. Meanwhile, the reference light R is a light that is used to generate interference fringes on the recording plane 20 by interference with object light from an original image and is normally set as a planar wave of predetermined wavelength that is made incident on the recording plane 20 at a predetermined incidence angle.

An observation region setting step of step S4 is a step of setting a plurality N of observation regions in the XYZ three-dimensional coordinate system. Here, an observation region is a region that indicates a range of viewpoint positions suited for observation of a specific original image and is a region that is set arbitrarily by a preparer of the hologram recording medium. In the present invention, this observation region serves an extremely important role. The plurality N of observation regions are set because the plurality N of original images were set in the original image preparation step of step S1. Put in another way, in step S4, observation regions of a number that is in accordance with the number of original images prepared in step S1 are set. The actual entity and function of the observation regions shall now be described by way of a specific example.

Figure 5:
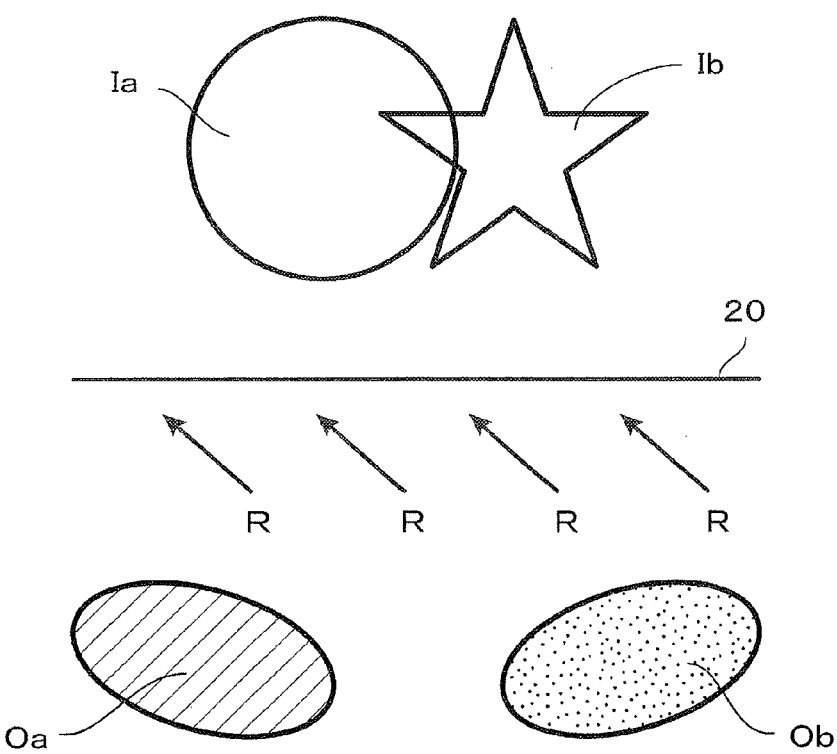
FIG. 5 is an upper view of an example of original images Ia and Ib, prepared in "S1: Original image preparation step," and a recording plane 20, a reference light R, and observation regions Oa and Ob, respectively set in "S2: Recording plane setting step," "S3: Reference light setting step," and "S4: Observation region setting step" in the flowchart of FIG. 3.

FIG. 5 is an upper view of an example of the original images Ia and Ib, prepared in the original image preparation step (step S1), the recording plane 20, set in the recording plane setting step (step S2), the reference light R, set in the reference light setting step (step S3), and observation regions Oa and Ob, set in the observation region setting step (step S4) in the flowchart of FIG. 3, and shows a state in which the XYZ three-dimensional coordinate system, shown in FIG. 4's, is viewed downward along the Z-axis direction. The paper surface of FIG. 5 is thus a surface that is parallel to the XY plane. In FIG. 5, the upper surfaces of the original images Ia and Ib, respectively shown in FIGS. 4A and 4B, are shown, and as mentioned above, these original images are partially overlapped. In the present example, the recording plane 20 is set as a plane perpendicular to the XY plane, and the reference light R is a planar wave of predetermined wavelength that is made incident on the recording plane 20 at a predetermined incidence angle.

With the example shown in FIG. 5, because two original images Ia and Ib are prepared, two observation regions Oa and Ob are set in accordance therewith. The first observation region Oa is a spheroidal (egg-shaped) spatial region, which is indicated by hatching by slanted lines, and the second observation region Ob is a spheroidal (egg-shaped) spatial region, which is indicated by hatching by dots. Here, the first observation region Oa is a region set by the preparer of the hologram recording medium as a region suited for the observation of the reproduction image of the first original image Ia, and the second observation region Ob is a region set by the preparer of the hologram recording medium as a region suited for the observation of the reproduction image of the second original image Ib.

With the illustrated example, because the first observation region Oa is set at a left side in front of the recording plane 20 and the second observation region Ob is set at a right side in front of the recording plane 20, when the hologram recording medium that is prepared by the following procedure is observed from the front left side, the first original image Ia can be observed, and when the hologram recording medium is observed from the front right side, the second original image Ib can be observed.

When the original images Ia and Ib, the recording plane 20, the reference light R, and the observation regions Oa and Ob have been set as shown in FIG. 5, a pattern computation step of step S5 is executed. Here, an interference fringe pattern, which is formed on the recording plane 20, is computed (interference fringe pattern simulation computation) based on the object light emitted from each individual unit light source that constitutes each original image and the reference light R.

Figure 6:
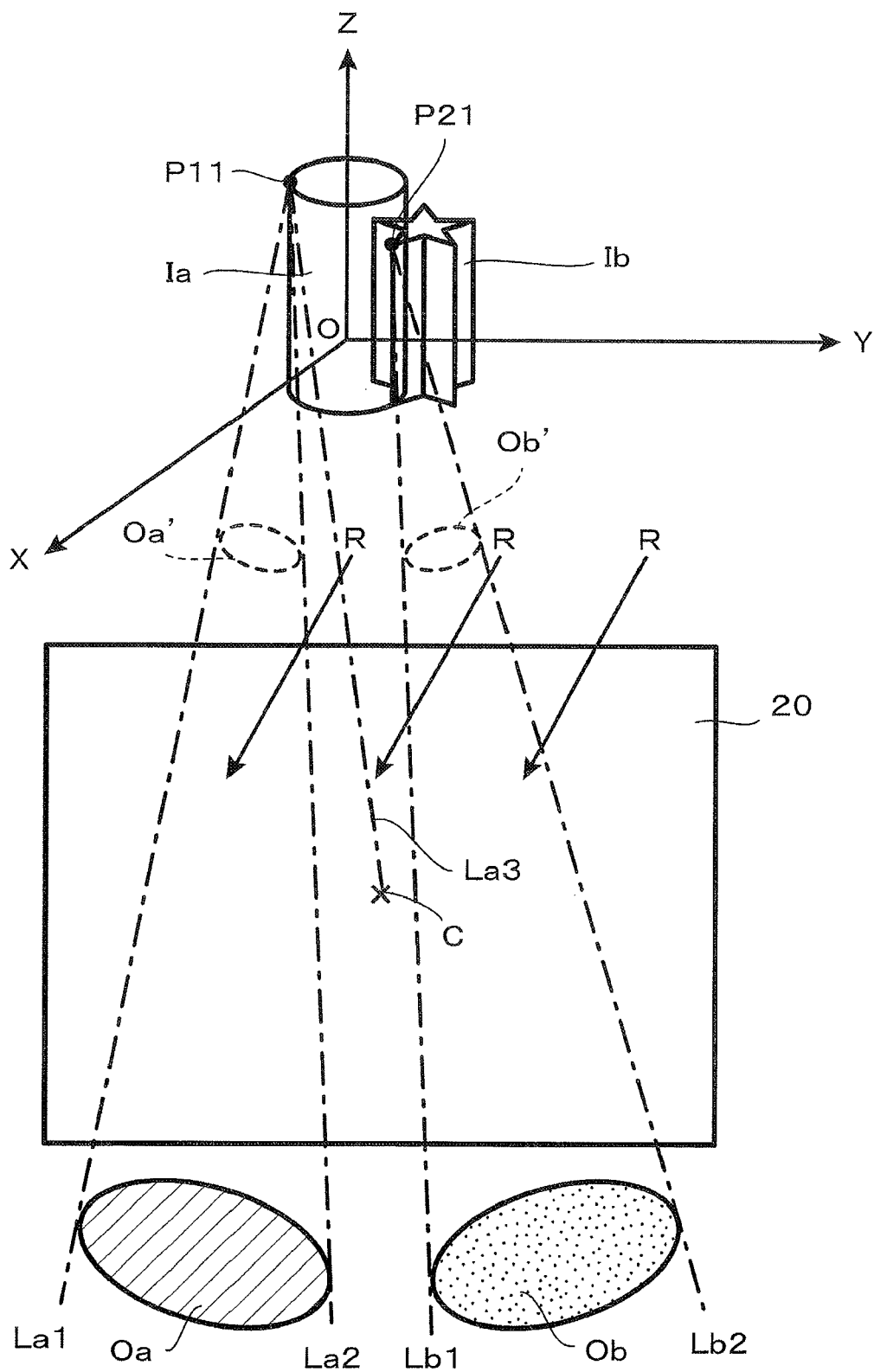
FIG. 6 is a perspective view of concepts of a computation process performed in "S5: Pattern computation step" in the flowchart of FIG. 3.

FIG. 6 is a perspective view of concepts of the computation process performed in the pattern computation step of step S5. In the illustrated XYZ three-dimensional coordinate system, the first original image Ia and the second original image Ib are the original images prepared in step S1 (as mentioned above, these original images are overlapped partially), the recording plane 20 is the plane set in step S2, the reference light R is the light set in step S3, and the observation regions Oa and Ob are the regions set in step S4. In the pattern computation step of step S5, the interference fringe pattern, which is formed on the recording plane 20, is determined by computation based on the object light from each individual point light source constituting the first original image Ia (in FIG. 6, only light paths of object light components La1 and La2 from the point light source P11 are indicated as an example by alternate long and short dash lines), the object light from each individual point light source constituting the second original image Ib (in FIG. 6, only light paths of object light components Lb1 and Lb2 from the point light source P21 are indicated as an example by alternate long and short dash lines), and the reference light R.

In actuality, a plurality of computation points that are aligned vertically and horizontally at predetermined pitches are defined on the recording plane 20 and a computation of determining the amplitude intensity of light at the position of each individual computation point is performed. For example, the computation concerning the position of an illustrated computation point C is performed as follows. First, the object light from each individual light source constituting the first original image Ia and the object light from each individual light source constituting the second original image Ib that reach the computation point C are synthesized to determine a synthetic object light. The amplitude intensity of an interference wave that is obtained at the computation point C by interference of the synthetic object light with the reference light R is then determined as a density value of the interference fringe pattern at the computation point C. Such a density value is obtained for each of the plurality of computation points defined on the recording plane 20, and the distribution of these density values becomes the interference fringe pattern to be determined in step S5.

This computation process of step S5 can generally be defined as a process of determining a synthetic object light by synthesizing the object light components emitted from the respective individual unit light sources constituting the respective original images and determining the interference fringe pattern formed on the recording plane 20 by the interference of the synthetic object light and the reference light by computation. More specifically, when an object light component emitted from an individual point light source constituting an original image is expressed by a formula using the complex number $A \cdot \exp(-i\omega t + i\phi)$ (where A is the amplitude, $\omega$ is the frequency, t is the time, $\phi$ is the phase, and i is the unit imaginary number), the synthetic object light for the position of a specific computation point C is determined by determining the sum of the above formula for all object light components that reach the position, and the interference wave intensity of this synthetic object light and the reference light R at the position of the computation point C is determined by computation. Because such a computation process in itself is known as a general method for "computer generated holograms," detailed description thereof shall be omitted here.

A characteristic of the present invention is that in this pattern computation step of step S5, the observation regions set in step S4 are used to select object light components to be taken into account in the computation (hereinafter referred to as "computation-incorporated light components"). In general terms, when N original images are prepared in step S1 and N observation regions are defined in step S4, computations that each takes into account only light components, which, among object light components from the unit light sources belonging to an i-th (i=1, 2, . . . , N) original image, reach an i-th (i=1, 2, . . . , N) observation region, are performed in the pattern computation step of step S5.

With the embodiment described up to now, N=2, the two original images Ia and Ib are prepared in step S1 as shown in FIGS. 4A and 4B, and the two observation regions Oa and Ob are set in step S4 as shown in FIG. 5. The computation process of step S5 is thus performed in a state of having selected computation-incorporated light components as follows. That is, in regard to the object light components from the point light sources (unit light sources) belonging to the first original image Ia, the light components that reach the first observation region Oa are deemed to be the computation-incorporated light components and a computation that takes only the computation-incorporated light components into account is performed. Likewise, in regard to the object light components from the point light sources (unit light sources) belonging to the second original image Ib, the light components that reach the second observation region Ob are deemed to be the computation-incorporated light components and a computation that takes only the computation-incorporated light components into account is performed.

The object light components La1 and La2, indicated by alternate long and short dash lines in FIG. 6, are object light components from the point light source P11 that belongs to the first original image Ia and because both narrowly meet the condition of reaching the first observation region Oa (because of passing through a contour line of the observation region Oa), these are used as computation-incorporated light components in the computation in step S5. However, because object light components that pass through the outer side of the region sandwiched by the object light components La1 and La2 (object light components that pass to the left side of La1 or the right side of La2 in the figure) do not reach the observation region Oa even if these object light components are from the point light source P11, these are not computation-incorporated light components and are ignored in the computation in step S5 (such object light components are treated as if not reaching the recording plane 20).

Likewise, the object light components Lb1 and Lb2, indicated by alternate long and short dash lines in FIG. 6, are object light components from the point light source P21 that belongs to the second original image Ib and because both narrowly meet the condition of reaching the second observation region Ob (because of passing through a contour line of the observation region Ob), these are used as computation-incorporated light components in the computation in step S5. However, because object light components that pass through the outer side of the region sandwiched by the object light components Lb1 and Lb2 (object light components that pass to the left side of Lb1 or the right side of Lb2 in the figure) do not reach the observation region Ob even if these object light components are from the point light source P21, these are not computation-incorporated light components and are ignored in the computation in step S5 (such object light components are treated as if not reaching the recording plane 20).

Such a computation process shall now be described more specifically. A case of determining the interference fringe pattern density value for a specific computation point C, defined on the recording plane 20 in the example shown in FIG. 6, shall be considered. In this case, conventionally (that is, with the conventional method), the interference fringe intensity is computed by taking into account the object light components that propagate toward the computation point C from all point light sources constituting the first original image Ia and the object light components that propagate toward the computation point C from all point light sources constituting the second original image Ib. This computing method is based on the basic law of physics that "light emitted from a point light source propagates across the entire surrounding space."

Meanwhile, with the present invention, first, for each individual point light source, a task of judging whether or not an object light component emitted from the point light source and propagating toward the computation point C is a computation-incorporated light component is performed in reference to an observation region defined in step S4. With the example shown in FIG. 6, the object light component La3, which is emitted from the point light source P11 and propagates toward the computation point C, is not a computation-incorporated light component. This is because, even if the light path of the object light component La3, indicated by the alternate long and short dash line in the figure, is extended downward, it does not reach the observation region Oa (whether or not the observation region Ob is reached is an irrelevant matter). Because the point light source P11 is a point light source constituting the first original image Ia, any light component, among the object light components emitted from the point light source P11, that does not reach the first observation region Oa is not taken into account in the computation. The second observation region Ob is not involved in judgments concerning the object light components from the point light source P11.

In determining the interference fringe intensity for the computation point C, the same judgment process is performed on each of all point light sources constituting the first original image Ia and furthermore on each of all point light sources constituting the second original image Ib. What is important here is that whereas in judging whether or not an object light component, emitted from a point light source constituting the first original image Ia, is a computation-incorporated light component, the criteria of whether or not the object light component reaches the first observation region Oa is used, in judging whether or not an object light component, emitted from a point light source constituting the second original image Ib, is a computation-incorporated light component, the criteria of whether or not the object light component reaches the second observation region Ob is used.

When by such a judgment task, the judging of whether an object light component is a computation-incorporated light component has been completed for all object light components propagating toward a specific computation point C from all point light sources constituting the original images Ia and Ib, the interference fringe intensity at the position of the specific computation point C can be computed. That is, a computation that takes into account only the light components that have been judged to be the computation-incorporated light components from among all of the object light components propagating toward the position of the computation point C is performed. By executing such a computation for each individual computation point C on the recording plane 20, a distribution of the interference fringe intensity values on the recording plane 20 is obtained in the form of an interference fringe pattern.

Figure 7:
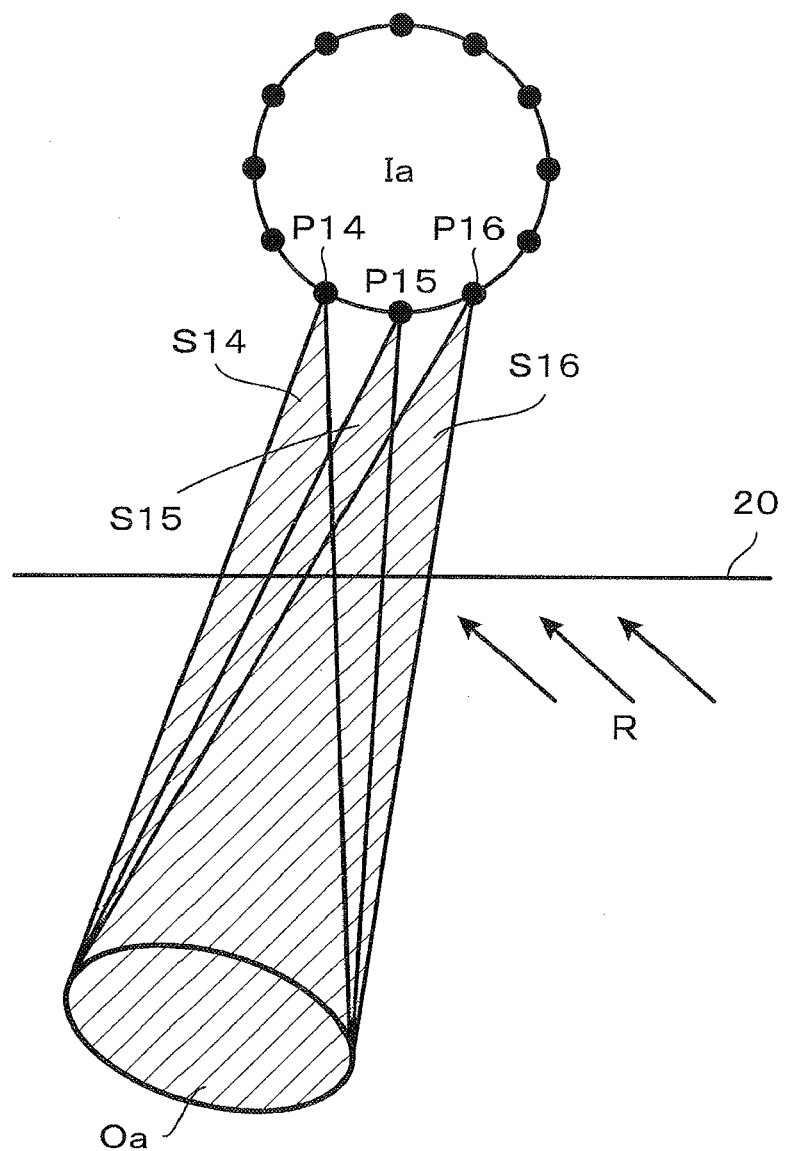
FIG. 7 is an upper view of computation-incorporated light components among light components emitted from respective point light sources constituting the original image Ia.
Figure 8:
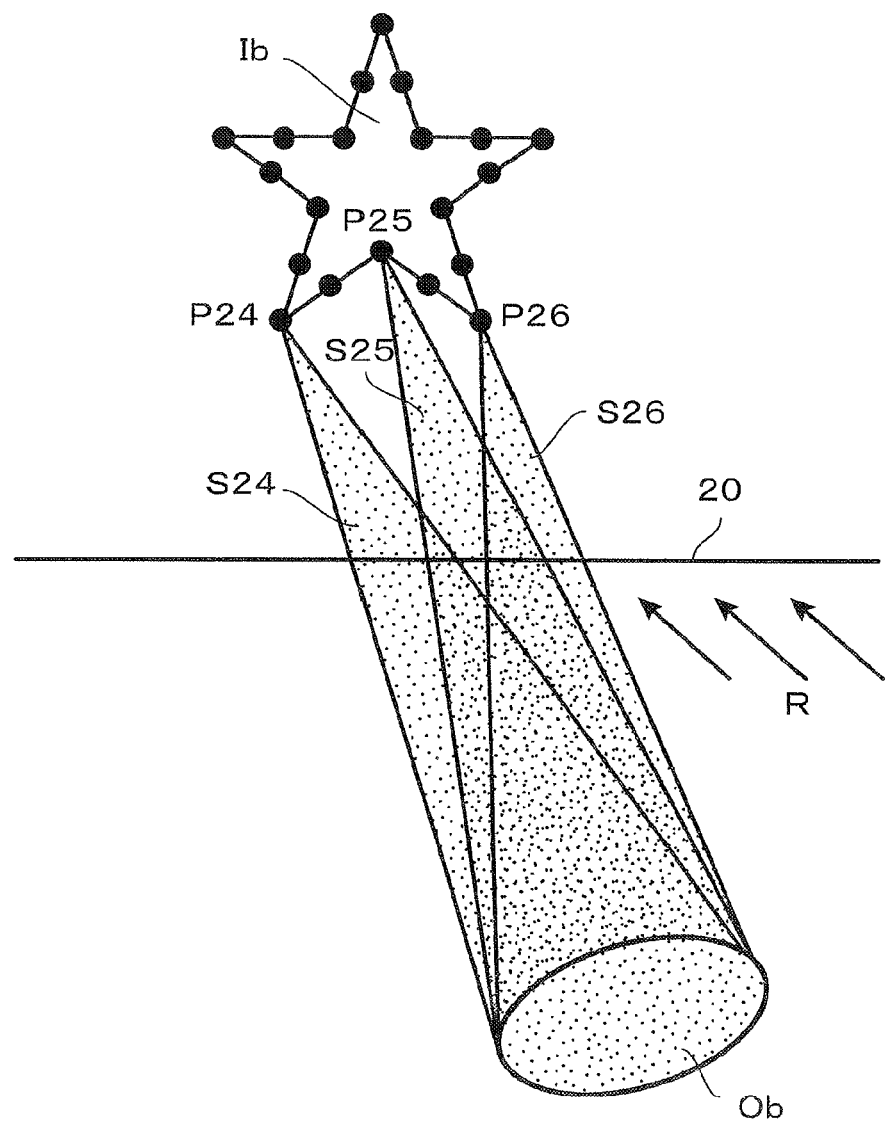
FIG. 8 is an upper view of computation-incorporated light components among light components emitted from respective point light sources constituting the original image Ib.

When the interference fringe generation simulation is performed by such a method, as shown in FIG. 7, in regard to object light components from point light sources P14, P15, and P16 and other point light sources of the first original image Ia, computations that take into account only the light components that propagate toward the first observation region Oa is performed as indicated by the slanted-line hatching. Also, as shown in FIG. 8, in regard to object light components from point light sources P24, P25, and P26 and other point light sources of the second original image Ib, computations that take into account only the light components that propagate toward the second observation region Ob is performed as indicated by the dot hatching. As a result, when, as in the observation modes shown in FIG. 2's, the hologram recording medium 10 is observed from the left viewpoint E1 (a position inside the first observation region Oa), the first reproduction image A (the reproduction image of the first original image Ia) is observed, and when the hologram recording medium 10 is observed from the right viewpoint E2 (a position inside the second observation region Ob), the second reproduction image B (the reproduction image of the second original image Ib) is observed.

In theory, when after recording the interference fringe pattern on the recording plane 20 upon setting the respective object light components and the respective reference light components R to the same monochromatic light (that is, light of the same, single wavelength) in performing the above-described interference fringe generation simulation, observation is performed upon illuminating the recording plane 20 with a reproduction illumination light of the same wavelength as the reference light R from the same direction, the first reproduction image A is observed only when the viewpoint is set inside the first observation region Oa and second reproduction image B is observed only when the viewpoint is set inside the second observation region Ob. However, in actuality, image reproduction of a hologram recording medium that is used in a cash voucher or credit card is generally carried out under an indoor illumination environment containing various wavelength components (an illumination environment close to white light), and the wavelength and illumination direction of the reproduction illumination light do not match those of the reference light R.

Thus, in actuality, the first reproduction image A is not necessarily observed only from inside the first observation region Oa, and the second reproduction image B is not necessarily observed only from inside the second observation region Ob. However, because a relationship, where the first reproduction image A is mainly reproduced upon observation from a vicinity of the first reproduction region Oa and the second reproduction image B is mainly reproduced upon observation from a vicinity of the second reproduction region Ob, is maintained, the object that different original images are reproduced upon observation from different positions can be achieved.

The pattern forming step of step S6 that is indicated as the last step in the flowchart shown in FIG. 3 is a step of forming the interference fringe pattern, determined in step S5, on a physical medium. In this step, any method may be employed as long as the density pattern of interference fringes can be formed in some way on a physical medium. Because various methods are already known as such a method, a detailed description shall be omitted here, and generally, a method of converting the interference fringe pattern, obtained in the pattern computation step of step S5, into a binary image pattern and forming the binary image pattern on a physical medium is employed widely. For example, a planar medium, constituted of the two colors of black and white, a three-dimensional structure medium, constituted of the two types of portions of recessed portions and protruding portions, etc., are generally used. Because the interference fringe pattern is an extremely fine pattern that gives rise to optical interference, in terms of practical use, a method, in which the fine pattern that is to be formed is provided to an electron beam printer and physical interference fringes are formed by scanning an electron beam across a medium is employed in many cases.

Section 2. Other Embodiments Related to Observation Regions

A basic embodiment of the present invention was described above in Section 1. In summary, the basic philosophy of the present invention is to perform, in the pattern computation step, computations that take into account only the object light components, among the object light components from each unit light source, that propagate toward a unique observation region, which is set in accordance with the original image to which the unit light source belongs. With the example shown in FIG. 6, in regard to the object light components from the unit light sources belonging to the first original image Ia, a computation, which takes into account only the object light components, which, among all object light components, propagate toward the first observation region Oa, is performed, and in regard to the object light components from the unit light sources belonging to the second original image Ib, a computation, which takes into account only the object light components, which, among all object light components, propagate toward the second observation region Ob, is performed. An observation region that is set in the present invention is thus a region that functions as a basis for selecting the computation-incorporated light components to be taken into account in computation from among the object light components from the unit light sources, and any type of region may be set as an observation region as long as such a function can be served. Here, other embodiments related to the setting of the observation region shall be described.

(1) Shape of the Observation Region

Although an example, in which observation regions Oa and Ob with spheroidal (egg-like) shapes are set, is shown in FIGS. 5 and 6, the shape of each observation region set in step S4 is not restricted to a specific shape, and observation regions of arbitrary shapes can be set according to the intentions of the preparer. The sizes of the observation regions can also be set arbitrarily. Because as mentioned above, an observation region is a region used for selection of whether or not each object light component is to be a computation-incorporated light component, the shape and size of the observation region may be arbitrary. An observation region also does not necessarily have to be a region constituted of a three-dimensional body and may be a region constituted of a plane or a curved surface. That is, because it suffices that judgment, of whether or not the light components emitted from the respective unit light sources constituting an original image can reach an observation region, is possible, various observation regions can be set as a plane, a curved surface, or a three-dimensional body in a three-dimensional coordinate system.

However, because the shape of an observation region is a matter that influences the observation modes of the hologram recording medium that is prepared in the final stage, it is preferably set as a region with a comparatively simple shape for practical use.

(2) Position of the Observation Region

The position of each observation region is also an important matter that influences the observation modes of the hologram recording medium that is prepared in the final stage. An example, where the observation regions Oa and Ob are set in front of the recording plane 20 as two regions that are separated to the left and right, is shown in FIGS. 5 and 6. When two observation regions are thus positioned to the left and right, it becomes possible to prepare a hologram recording medium with the characteristic that the first reproduction image A (original image Ia) is observed upon observation from a generally left side, and the second reproduction image B (original image Ib) is observed upon observation from a generally right side. Meanwhile, when the two observation regions are positioned at upper and lower sides, a hologram recording medium, with the characteristic that the first reproduction image A is observed upon observation from the upper side, and the second reproduction image B is observed upon observation from the lower side, can be prepared.

Also, although an example where the observation regions are set at the opposite side of the recording plane 20 with respect to the original images is shown in FIGS. 5 and 6, the observation regions may be set at the same side as the original images. For example, in FIG. 6, the recording plane 20 is positioned in front of the original images Ia and Ib and the observation regions Oa and Ob are set in front of the recording plane 20. However, the observation regions do not necessarily have to be positioned at the front side of the recording plane 20 and may be positioned at the other side of the recording plane. Observation regions Oa' and Ob', indicated by broken lines in FIG. 6, are regions of an example in which the observation regions are set at the other side (the same side as the original images) of the recording plane 20. The light components, which, among the object light components emitted from the point light sources constituting the first original image Ia, reach the observation region Oa' (that is, the light components that propagate toward the recording plane 20 upon passing through the observation region Oa'), become the computation-incorporated light components, and likewise, the light components, which, among the object light components emitted from the point light sources constituting the second original image Ib, reach the observation region Ob' (that is, the light components that propagate toward the recording plane 20 upon passing through the observation region Ob'), become the computation-incorporated light components in this case as well.

When such settings are made, the observation regions Oa' and Ob' lose the significance as regions for placing viewpoints and become regions that serve as a basis for judging computation-incorporated light components. In FIG. 6, because the light paths of the object light components from the point P11 are indicated by alternate long and short dash lines, in regard to the object light components from point P11, the light components that pass within the observation region Oa' reach the interior of the observation region Oa. However, in regard to object light components from other points, light components that pass within the observation region Oa' do not necessarily reach the interior of the observation region Oa. Setting of the observation region Oa' is thus not equivalent to setting the observation region Oa. Actually, with the example shown in FIG. 6, although when recording is performed upon setting the observation region Oa', a portion of the original image Ia appears chipped upon observation from a viewpoint within the observation region Oa, in the case of an application with which there is no problem with such an observation mode, the observation region Oa' can be set in place of Oa.

(3) Interrelationship Among the Plurality of Observation Regions

The two observation regions Oa and Ob shown in FIGS. 5 and 6 are regions that are spatially exclusive with respect to each other and there is no spatial overlapping between the two. A basic function of the hologram recording medium according to the present invention is the function that different original images are reproduced when observed from different positions, and in realizing such a function, it is preferable, in the process of setting the plurality N of observation regions in the observation region setting step, to set the regions to be spatially exclusive regions with respect to each other.

However, as mentioned above, in an actual environment in which the hologram recording medium is reproduced, because the wavelength and illumination direction of the reproduction illumination light do not match those of the reference light R, even if the two observation regions Oa and Ob are set as regions that are spatially exclusive with respect to each other as shown in FIGS. 5 and 6, a phenomenon that an unintended reproduction image is observed from an unintended position can occur. For example, the first reproduction image A (first original image Ia) may be observed even upon observation from within a region besides the observation region Oa, and the second reproduction image B (second original image Ib) may be observed even upon observation from within a region besides the observation region Ob.

In consideration of the above, for practical use, the plurality N of observation regions do not necessarily have to be set as regions that are spatially exclusive with respect to each other. In actuality, a portion or all of the plurality N of observation regions may be set as regions that partially overlap spatially with another observation region. A hologram recording medium that is prepared using such settings of partially overlapping regions becomes a recording medium with which the occurrence of a phenomenon that a plurality of original images are observed simultaneously upon observation from a specific position is presumed in advance.

For example, when with the example shown in FIGS. 5 and 6, a right side portion of the first observation region Oa and a left side portion of the second observation region Ob are overlapped spatially, even when a reproduction illumination light that is exactly the same as the reference light is used, a point, at which both the reproduction images A and B are observed overlappingly, becomes present at a position intermediate the viewpoint E1 shown in FIG. 2A and the viewpoint E2 shown in FIG. 2B. Thus, as the viewpoint is moved gradually from the left side to the right side, the observed reproduction image changes gradually from the first reproduction image A to the second reproduction image B. To realize such an observation mode, two observation regions are set so as to overlap with each other partially.

(4) Setting the Same Observation Region

According to the basic principles of the present invention, when a plurality N of original images are prepared in the original image preparation step (step S1), the same plurality N of observation regions are set in the observation region setting step (step S4), and in the pattern computation step (step S5), computations that each takes into account only the light components, which, among object light components from the unit light sources belonging to an i-th (i=1, 2, ..., N) original image, reach the i-th (i=1, 2, ..., N) observation region, are performed. For example, when N=3, three original images and three observation regions are prepared, and in regard to object light components from the first original image, a computation that takes into account only the light components that reach the first observation region is performed, in regard to object light components from the second original image, a computation that takes into account only the light components that reach the second observation region is performed, and in regard to object light components from the third original image, a computation that takes into account only the light components that reach the third observation region is performed.

Here, although as has been described in (3) above, a portion or all of the N observation regions may be set as regions that partially overlap spatially with another observation region, a portion or all of the N observation regions may also be set as regions that spatially match another observation region completely. For example, when three original images and three observation regions are prepared as mentioned above, the region Oa shown in FIGS. 5 and 6 may be set as the first observation region and the second observation region, and the region Ob may be set as the third observation region. In this case, the first observation region and the second observation region are set as regions that are completely the same (obviously, a portion of the observation region Oa and a portion of the propagation Ob may be overlapped spatially).

By such settings, a hologram recording medium can be prepared with which the first reproduction image and the second reproduction image can be observed upon observation from the first viewpoint E1 and the third reproduction image can be observed upon observation from the second viewpoint E2. With such a hologram recording medium, because the first observation region and the second observation region are set to the same region, the first original image and the second original image are recorded under the same conditions and, as a result, the observation modes of the first reproduction image and the second reproduction image are the same. That is, if upon observation from a certain viewpoint, the first reproduction image can be observed, the second reproduction image can also be observed at the same time. However, because the third observation region is set as a separate region, the third original image is recorded under separate conditions and the observation mode of the third reproduction image is different.

That "different original images are reproduced upon observation from different positions" in the present invention does not mean that "for a plurality N of original images, just one of the original images can be observed upon observation from a certain specific position" but means that "the combination of observable original images, among a plurality N of original images, changes when the observation position is changed."

Section 3. Embodiment of Applying Restrictions by Plate-Like Spaces

Methods, of performing computation upon applying some form of restriction on the spreading of an object light from unit light sources constituting an original image in preparing a computer generated hologram, are known. For example, Japanese Patent Laid-open Publications No. H11-24539A and No. H11-202741A disclose methods of computing interference fringe intensities upon restricting the spreading of an object light from a point light source within a space defined by a predetermined angle of spread. Such "computation performed upon restricting the spread angle of the object light" is equivalent to a "computation performed by taking into account only light components inside a predetermined spread angle," and from this standpoint, the technical philosophy of the "computation that takes into account only a portion of the object light" has already been disclosed in the abovementioned patent publications. For example, with the example shown in FIG. 6, "computation is performed by taking into account only the light components, which, among the object light components emitted from the point light source P11, reach the observation region Oa," and such a manner of handling is equivalent to "performing computation upon restricting the spread angle of the object light emitted from the point light source P11 within a subulate region sandwiched by the alternate long an short dash lines La1 and La2."

However, the purpose of "restricting the spread angle of the object light" in the method disclosed in these publications is to suppress luminance non-uniformity or to lighten the computational load and is not to enable reproduction of different original images upon observation from different positions as in the present invention. As a matter of course, the important characteristic of the present invention of setting a unique observation region (setting an object light spread angle) according to each individual original image is not disclosed whatsoever in these publications.

Although the actions and effects of the "restriction of the spread angle of object light" in the present invention and the actions and effects of the "restriction of the spread angle of object light" in the abovementioned known examples thus differ completely in principle, because these share the point that the spread angle of object light is restricted in some form in computing the interference fringe intensities, the two can be used in combination. Put in another way, in putting the present invention into practice, the "restriction of the spread angle of object light" of the abovementioned known example can be applied overlappingly. An example of such an embodiment shall now be described.

Figure 9:
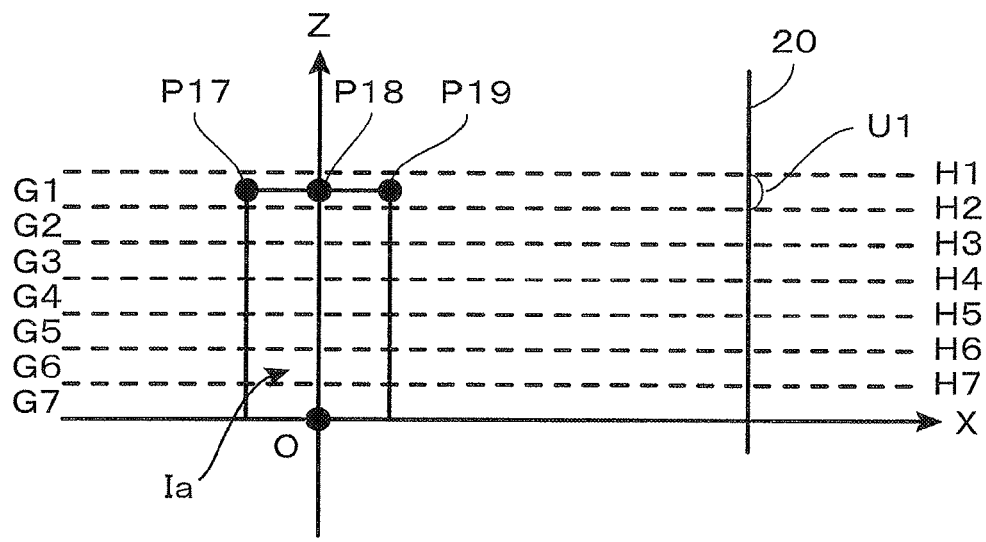
FIG. 9 is a sectional view of concepts of partitioning a three-dimensional space into a plurality of plate-like spaces and computing an interference fringe pattern using computation-incorporated light components, to which is applied a weighting condition of light components, which, among those emitted from the respective point light sources, reach the recording plane upon propagating through only a single plate-like space.

FIG. 9 is a sectional view of concepts of performing interference fringe pattern computation upon partitioning a three-dimensional space, defined by the XYZ coordinate system, into a plurality of plate-like spaces and applying a weighting condition that the recording plane is reached only by propagation through a single plate-like space as a condition for object light components, emitted from the respective point light sources, to be computation-incorporated light components. That is, with the present embodiment, in the selection of object light components, emitted from the respective point light sources, as computation-incorporated light components, not only the condition of "reaching a specific observation region" (the above-described condition that is a characteristic of the present invention), but the weighting condition of "propagating through one and only one plate-like space until at least the recording plane is reached" is also applied. From the standpoint of "restricting of the spread angle of object light," the above means that a spread angle restriction that meets both the condition of a "spread angle enabling reaching of a specific observation region" and the condition of a "spread angle enabling the reaching of the recording plane through just one plate-like space" is applied.

With the illustrated example in FIG. 9, the three dimensional space is partitioned into a plurality of plate-like spaces G1 to G7 by seven slicing planes H1 to H7, indicated by broken lines. Here, each of the slicing planes H1 to H7 is a plane parallel to the XY plane. For example, the plate-like space G1 is a space sandwiched between the slicing planes H1 and H2, the plate-like space G2 is a space sandwiched between the slicing planes H2 and H3, and the plate-like space G7 is a space sandwiched between the slicing plane H7 and the XY plane.

In the figure, Ia is a first original image of cylindrical columnar shape, and P17, P18, and P19 are examples of point light sources that constitute the first original image Ia. A plane 20 at the right side of the figure is a recording plane defined in the XYZ coordinate system, and an interference fringe intensity is computed for each of a plurality of computation points positioned on the recording plane 20 (the illustration of the reference light R is omitted).

As mentioned above, with the present invention, computation that takes into account only the light components, which, among the object light components emitted from the point light sources constituting the first original image Ia, reach the first observation region (not shown in FIG. 9), is performed. With the embodiment described here, as a further weighting condition, only light components, which, among the object light components emitted from a specific point light source, reach the recording plane 20 upon propagating through only the plate-like space to which the point light source belongs, are handled as the computation-incorporated light components. Put in another way, even if a light component reaches the first observation region, the light component does not become a computation-incorporated light component if it reaches the recording plane 20 via a plurality of the plate-like spaces.

For example, because the illustrated points P17, P18, and P19 are point light sources positioned inside the first plate-like space G1, only the object light components from the point light sources P17, P18, and P19 that satisfy both a first condition of reaching a predetermined observation region that has been set in advance (the observation region defined in correspondence to the first original image Ia; not shown in FIG. 9) and a second condition of reaching the recording plane 20 upon propagating through only the first plate-like space G1 are taken into account as subjects of computation.

Here, if, of the recording plane 20, the region sandwiched between the slicing planes H1 and H2 is referred to as a unit recording region U1 as shown in the figure, then among the object light components from the point light sources P17, P18, and P19 positioned in the plate-like space G1, the object light components, which are to be taken into account in the computation of the interference fringe pattern formed on the recording plane 20, are restricted to only the light components that "reach the predetermined observation region set in advance" and "reach the unit recording region U1." That is, although the object light components from the point light sources P17, P18, and P19 are emitted to the entire space inside the XYZ coordinate system, in the embodiment described here, of these object light components that are emitted to the entire space, "the light components that do not reach the predetermined observation region set in advance" and "the light components that do not reach the unit recording region U1 (the light components that propagate out of the plate-like space G1 before reaching the recording plane 20)" are not taken into account whatsoever in the computation of the interference fringe pattern.

Put in another way, the object light components from the point light sources P17, P18, and P19 are used only in the interference fringe intensity computation for a computation point positioned inside the illustrated unit recording region U1 (a strip-like region that extends in the direction perpendicular to the paper surface) and are not involved whatsoever in computations concerning computation points positioned at other positions. Obviously, the object light components from the point light sources P17, P18, and P19 are not necessarily used in the interference fringe intensity computations for all computation points inside the unit recording region U1 but are used only in the interference intensity computations of computation points, each of which satisfies being "a computation point that is within the unit recording region U1" and being "a computation point, for which light propagating thereto reaches the interior of the predetermined observation region that has been set in advance."

Thus, in general, the characteristic of the embodiment described here is that in the pattern computation step, a three-dimensional space is partitioned into a plurality M of plate-like spaces by slicing by a plurality of mutually parallel planes and computations that each takes into account only light components, which, among object light components from unit light sources, inside a j-th (j=1, 2, ... M) plate-like space and belonging to an i-th (i=1, 2, ..., N) original image, reach an i-th (i=1, 2, ..., N) observation region and reach the recording plane only through the j-th (j=1, 2, ..., M) plate-like space, are performed.

By thus applying the condition (the condition of reaching a predetermined observation region) that is a characteristic of the present invention and a condition based on a conventionally known method (for example, the condition of passing through only one plate-like space until the recording plane is reached as described above) in an AND condition to perform the interference fringe intensity computation, a synergistic effect of the actions and effects unique to the present invention (the making of different original images be reproduced upon observation from different positions) and the actions and effects unique to the conventionally known method (suppression of luminance non-uniformity and lightening of the computation load) can be obtained.

Thus, although an essential basic concept of the present invention is to "perform computations by taking into account only light components, which, among object light components from a unit light source, reach a specific observation region," this does not mean that "light components, which, among object light components from a unit light source, reach a specific observation region are always taken into account in the computations." When as in the example described above, a weighting condition is added as a condition for selecting object light components as computation-incorporated light components, obviously "a light component, which, among object light components from a unit light source, reaches a specific observation region" does not become a computation-incorporated light component unless the weighting condition is satisfied. That is, with the present invention, to "perform a computation by taking into account only light components, which, among object light components from a unit light source, reach a specific observation region" can be put in another way as "not taking into account light components, which, among object light components from a unit light source, do not reach the specific observation region."

Section 4. Embodiment Using Segment Light Sources

Figure 10A:
FIGS. 10A and 10B are diagrams of concepts of preparing a segment light source PP based on a point light source P.
Figure 10B:
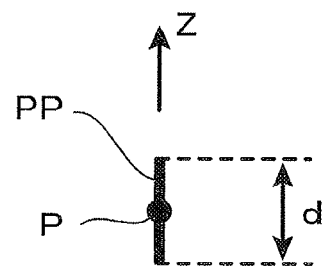

With the embodiments described up to now, examples using point light sources as the unit light sources that constitute an original image have been described. However, in putting the present invention into practice, the individual unit light sources that constitute an original image do not necessarily have to be point light sources. For example, by defining a segment light source as a locus of moving a point light source P, shown in FIG. 10A, by just d/2 in each of the upward and downward directions along the Z-axis, a segment light source PP with a length d can be defined as shown in FIG. 10B. Each of the original images prepared in step S1 of the present invention may be constituted of a collection of such segment light sources PP.

For example, although the original image Ia shown in FIG. 4A and the original image Ib shown in FIG. 4B are both constituted of collections of point light sources, by defining segment light sources as the loci of moving the respective individual point light sources upward and downward along the Z-axis by just d/2, the respective original images Ia and Ib can be handled as collections of segment light sources of length d.

In general, a point light source is a light source that emits object light that is constituted of a spherical wave and an object light from a point light source spreads radially with the position of the point light source as the center. Meanwhile, because light from a segment light source is not a spherical wave, a segment light source must be handled in a slightly different manner from a point light source.

One method of handling a segment light source is to handle it as a light source that is formed by aligning a plurality of point light sources along a segment of predetermined length, that is, as a light source constituted of a set of point light sources. When a segment light source is thus handled as a collection of point light sources, the object light can be defined as a synthetic wave of spherical waves emitted radially from the respective point light sources. For example, the segment light source PP shown in, FIG. 10B can be handled as a collection of a plurality of point light sources from a point light source positioned at a lower end of the segment to a point light source positioned at an upper end of the segment, and the object light can be defined as a synthetic wave of spherical waves emitted radially respectively from the individual point light sources.

Another method of handling a segment light source is a method that is in accordance with a line light source. The wavefront of an object light emitted from a theoretical line light source (a line light source of infinite length) is a side surface of a cylindrical column having the position of the line light source as central axis. For example, in the case of a line light source extending along the Z-axis, the wavefront is a side surface of a cylindrical column having the Z-axis as the central axis, all object light components propagate in directions orthogonal to the Z-axis, and there are no object light components that propagate in a direction along the Z-axis. Although a segment light source is actually a light source of finite length, it can be handled in a manner that is in accordance with a line light source. In this case, the wavefront of an object light emitted from the segment light source is a side surface of a cylindrical column having the position of the segment light source as the central axis and there are no object light components that propagate in a direction along the segment light source. An example of such handling of a segment light source is disclosed in Japanese Patent Laid-open Publication No. 2001-013858A.

Figure 11:
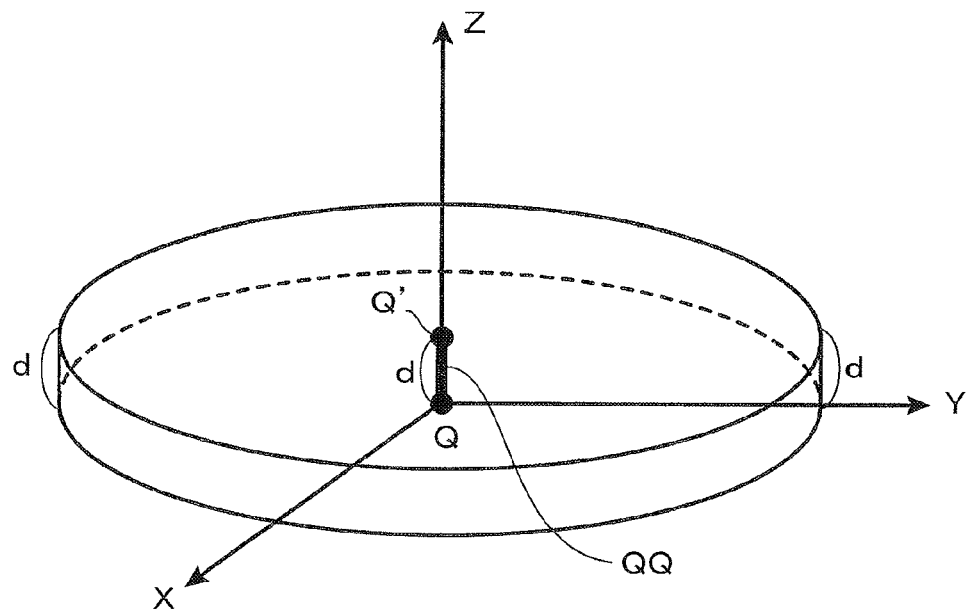
FIG. 11 is a perspective view of an example of defining an object light, with a wavefront of the form of a side surface of a cylindrical column, for a segment light source QQ.

As an example shown in FIG. 11, a segment light source QQ, constituted of a segment with a length d (a segment joining a lower end point Q and an upper end point Q'), shall now be considered with the lower end point Q being defined at the position of the origin of the XYZ three-dimensional coordinate system and the upper end point Q' being defined at a position along the Z-axis that is separated from the lower end point Q by just the distance d. When this segment light source QQ is handled in a manner that is in accordance with a line light source, an object light emitted from an arbitrary position on the segment light source QQ is light that spreads radially from the Z-axis as the center and along a plane that passes through the arbitrary position and is parallel to the XY plane. To describe with a specific example, an object light emitted from the upper end point Q' in the figure is light that propagates radially along a plane, expressed by the formula: $Z=d$, so as to move away from the upper end point Q', and the directions of propagation of all object light components are orthogonal to the Z-axis. Put in another way, the wavefront of the object light emitted from the segment light source QQ is a side surface of a cylindrical column of height d having the Z-axis as the center axis as illustrated.

When the segment light source QQ is handled in such a manner that is in accordance with a line light source, results close to those of the "embodiment of applying restrictions by plate-like spaces," which was described in Section 3, are obtained. Although an example in which the three-dimensional space, formed by the XYZ coordinate system, is partitioned by slicing planes H1 to H7 to form the plurality of plate-like spaces G1 to G7 is shown in FIG. 9, a case where the interval of each of the slicing planes H1 to H7 is set to d and the individual point light sources are replaced by segment light sources of length d that respectively fit inside the corresponding plate-like spaces shall be considered here.

Figure 12:
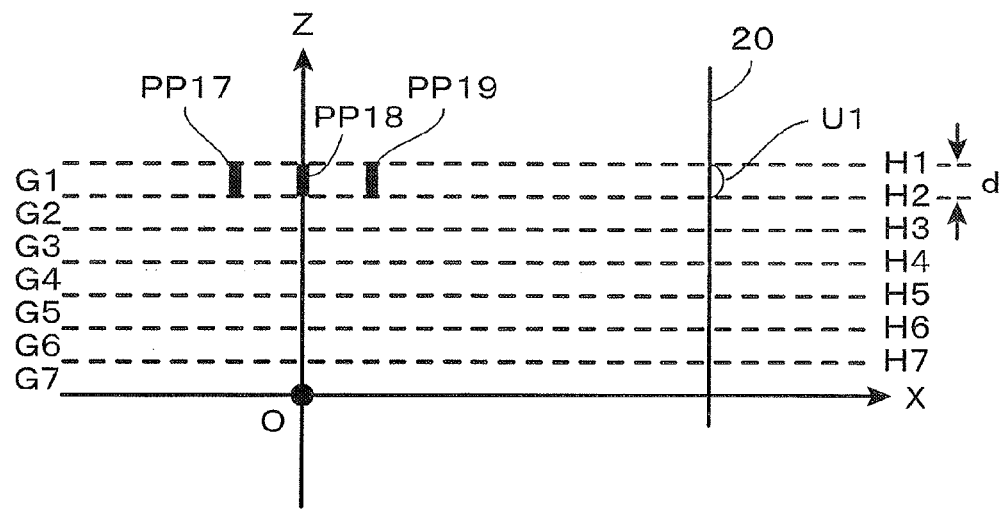
FIG. 12 is a side view of an example of a method for computing an interference fringe pattern for an original image constituted of segment light sources.

For example, FIG. 12 shows an example where the point light sources P17, P18, and P19, shown in FIG. 9, are respectively replaced by segment light sources PP17, PP18, and PP19. Each of the segment light sources PP17, PP18, and PP19 has a length d and fits exactly inside the plate-like space G1. Because when each segment light source is handled in a manner that is in accordance with a line light source, the object light propagates only in horizontal directions (directions parallel to the XY plane) in FIG. 12, the object light components from the segment light sources PP17, PP18, and PP19 reach only points within the unit recording region U1 by propagating only through the interior of the plate-like space G1.

Obviously in this case, not all of the object light components from the segment light sources PP17, PP18, and PP19 are selected as computation-incorporated light components for all computation points inside the unit recording region U1. For selection as a computation-incorporated light component, the basic condition that the specific observation region, which is not illustrated, is reached must obviously be satisfied. However, if the illustrated segment light sources PP17, PP18, and PP19 are handled in a manner that is in accordance with line light sources (that is, if the light sources are handled in a manner such that the wavefront of the object light is a side surface of a cylindrical column such as shown in FIG. 11), because the object light components from the segment light sources PP17, PP18, and PP19 necessarily reach the interior of the unit recording region U1 by propagating only through the interior of the plate-like space G1, the weighting condition, described in Section 3 is always satisfied.

Although an example of using segment light sources in place of point light sources as the unit light sources constituting an original image was described above, besides this, plane light sources may also be used as the unit light sources. For example, in a case of using an original image that is defined as a collection of polygons, each individual polygon may be handled as a plane light source.

Section 5. Embodiments in Which the Reference Light is Not Set

In the pattern computation step in the embodiments described up to now, the interference fringe pattern formed on the recording plane 20 is computed based on the object light, emitted from each individual unit light source constituting an original image, and the reference light. However, in recording the information of the original image as a hologram on the recording plane 20 using the "computer generated hologram" method, the information do not necessarily have to be recorded in the form of an interference fringe pattern. Put in another way, the reference light does not have to be set necessarily.

Generally, in an optical hologram recording method using a silver halide film, because an original image must be recorded as an interference fringe pattern on the silver halide film that is to be the recording plane, a reference light must be prepared in addition to the object light and these two must be made to interfere with each other. However, theoretically, as long as information on the amplitude and phase (complex amplitude) of a synthetic wave, obtained by synthesizing all object light components arriving from an original image, are recorded on the recording plane, the original image can be reproduced. Because by using the "computer generated hologram" method, a complex amplitude pattern that is formed on the recording plane 20 can be determined from the object light by performing a computation based on the amplitude and phase of the arriving light and without setting a reference light, a hologram recording medium can be prepared by forming this complex amplitude pattern in some form on a physical medium.

That is, with the embodiment described in this Section 5, although the same procedures as those of the embodiments described above are performed in the "original image preparation step" of step S1, in the "recording plane setting step" of step S2 and in the "observation region setting step" of step S4 in the flowchart of FIG. 3, the "reference light setting step" of step S3 is unnecessary.

Also, in the "pattern computation step" of step S5, instead of computing an interference fringe pattern, a complex amplitude pattern, which is formed on the recording plane 20 by synthesis of the object light components emitted from the individual unit light sources constituting the respective original images, is computed. Obviously, the point that, in handling the object light components from the respective unit light sources, computation is performed upon deeming that only light components which reach a certain observation region are taken into account, is exactly the same as that of the embodiments described thus far.

Specifically, the complex amplitude pattern is computed as follows. That is, an object light emitted from an individual point light source constituting an original image is expressed by a formula using the complex number: $A \cdot \exp(-i\omega t + i\phi)$ (where A is the amplitude, $\omega$ is the frequency, t is the time, $\phi$ is the phase, and i is the unit imaginary number), and for the position of a specific computation point C, the sum of these formulae for all computation-incorporated light components that reach the position is determined. The formula expressing this sum is also expressed using the complex number: $A \cdot \exp(-i\omega t + i\phi)$ and indicates complex amplitude information (amplitude information and phase information). A complex amplitude pattern (a distribution pattern of amplitude values and phase values) can thus be obtained on the recording plane 20.

The equation using "$A \cdot \exp(-i\omega t + i\phi)$" contains the time t as a parameter and the amplitude and phase are quantities that vary with time. Thus, in actuality, a specific sampling time point is set (t is provided with an arbitrary value (such as 0)) and the complex amplitude pattern on the recording plane 20 at this sampling time point is determined. Specifically, a process, of defining a plurality of computation points discretely on the recording plane 20, determining the amplitude and the phase of the synthetic object light at the predetermined sampling time point at each computation point position, and thereby determining the complex amplitude pattern as a discrete distribution of amplitudes and phases, is performed.

Meanwhile, in the "pattern forming step" of step S6, the complex amplitude pattern must be formed in place of an interference fringe pattern (contrasting density pattern) on a physical medium. As mentioned above, because the complex amplitude pattern is a pattern having information on both amplitudes and phases, not only an amplitude but a phase must also be recorded on a predetermined position of a physical medium. In addition, in order for a correct hologram reproduction image to be obtained upon illumination of a reproduction illumination light onto the medium, optical modulation that is in accordance with the amplitude and phase recorded at each individual position must be performed on the reproduction illumination light made incident on the medium.

As one method of forming such a complex amplitude pattern on a physical medium, the inventor of the present Application proposes a method of using a plurality of cells with a three-dimensional structure. In summary with this method, a cell, constituted of a three-dimensional structure, is positioned at each individual computation point position of the recording plane 20 and information on the amplitude and the phase of the computation point position corresponding to the cell is recorded in the three-dimensional structure of each individual cell. A specific three-dimensional structure of an individual cell is disclosed, for example, in U.S. Pat. Nos. 6,618,190 and 6,934,074, etc., and detailed description thereof shall be omitted here.

Section 6. Manufacturing Device According to the Present Invention

Lastly, basic arrangements of hologram recording medium manufacturing devices according to the present invention shall be described with reference to the block diagrams of FIGS. 13 and 14. The manufacturing device shown in FIG. 13 is a device for executing steps S1 to S6 shown in the flowchart of FIG. 3 and has a function of manufacturing a hologram recording medium with an arrangement such that different original images are reproduced upon observation from different positions.

Figure 13:
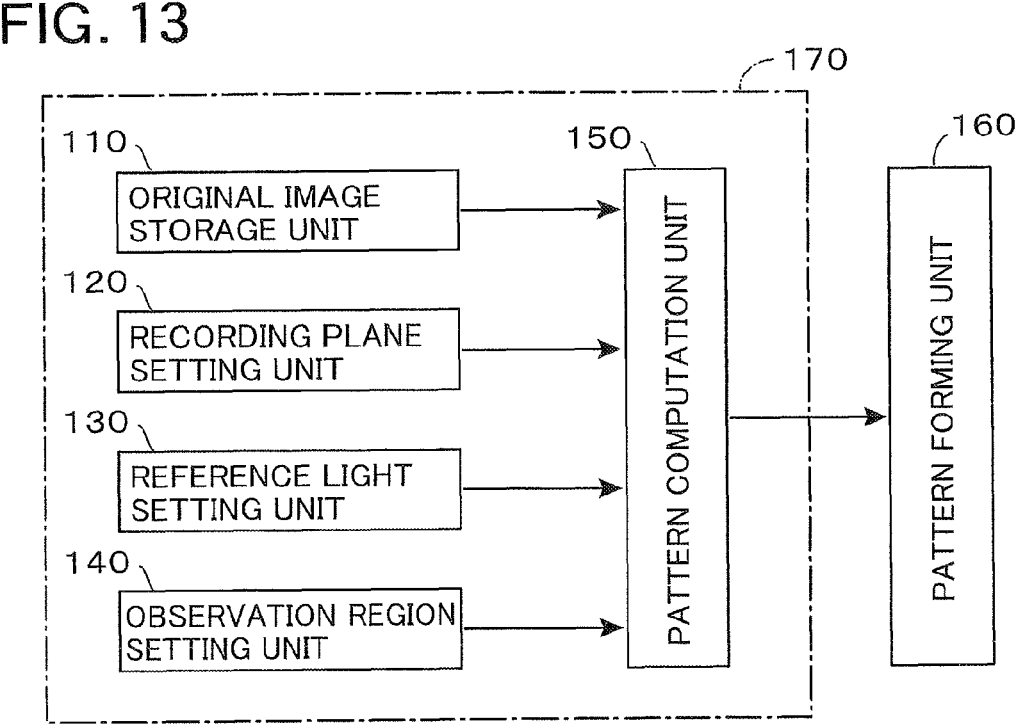
FIG. 13 is a block diagram of a basic arrangement of a hologram recording medium manufacturing device according to the present invention.

In FIG. 13, an original image storage unit 110 is a component for storing the information of the original images prepared in the "original image preparation step" of step S1 and has a function of storing the plurality N of original images respectively as data indicating sets of unit light sources positioned in the XYZ three-dimensional coordinate system.

Also, a recording plane setting unit 120 is a component for executing the "recording plane setting step" of step S2 and has a function of performing a process of setting the predetermined recording plane 20 in the XYZ three-dimensional coordinate system. A reference light setting unit 130 is a component for executing the "reference light setting step" of step S3 and has a function of performing a process of setting the predetermined reference light R in the XYZ three-dimensional coordinate system. Meanwhile, an observation region setting unit 140 is a component for performing the "observation region setting step" of step S4 and has a function of setting the plurality N of observation regions in the XYZ three-dimensional coordinate system. In actuality, the recording plane setting unit 120, the reference light setting unit 130, and the observation region setting unit 140 can be realized by input devices and data storage devices (any of various memories, hard disk devices, etc.) for a computer and dedicated programs for the setting processes.

A pattern computation unit 150 is a component for executing the "pattern computation step" of step S5 and performs a process of computing an interference fringe pattern formed on the recording plane 20 based on the object light components, emitted from the individual unit light sources constituting the respective original images, and the reference light R. Here, as was described above, computations that each takes into account only light components, which, among object light components from each unit light source belonging to an i-th (i=1, 2, ..., N) original image, reach an i-th (i=1, 2, ..., N) observation region, are performed. In actuality, the pattern computation unit 150 can be realized by a dedicated program installed in a computer.

Furthermore, a pattern forming unit 160 is a component having a function of forming the interference fringe pattern, determined by the pattern computation unit 150, on a physical medium. Specifically, the pattern forming unit 160 can be arranged from, for example, an electron beam printer and computer that controls it.

Figure 14:
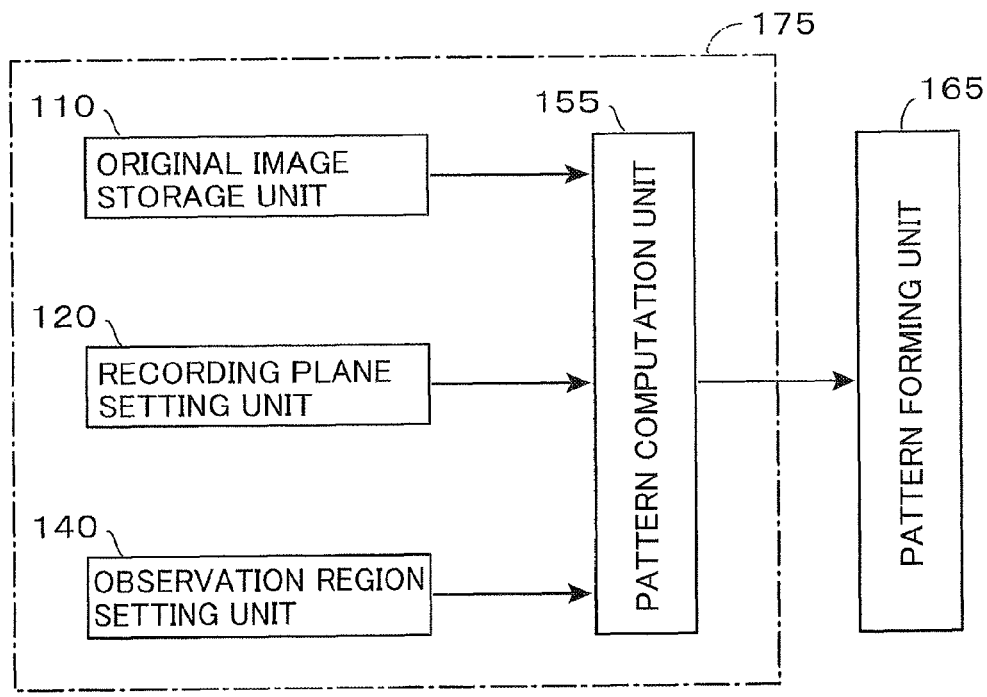
FIG. 14 is a block diagram of another basic arrangement of a hologram recording medium manufacturing device according to the present invention.

Meanwhile, the manufacturing device shown in FIG. 14 is a manufacturing device for carrying out the embodiment of not setting a reference light that was described in Section 5. The original image storage unit 110, the recording plane setting unit 120, and the observation region setting unit 140 are exactly the same as the respective components shown in FIG. 13. However, the device shown in FIG. 14 does not have the reference light setting unit 130. A pattern computation unit 155 performs a process of computing a complex amplitude pattern (distribution pattern of amplitudes and phases), which is formed on the recording plane 20 by synthesizing the object light components (computation-incorporated light components) emitted from the individual unit light sources constituting the respective original images, as was described in Section 5. A pattern forming unit 165 performs a process of forming the complex amplitude pattern, determined by the pattern computation unit 155, on a physical medium as was described in Section 5.

For practical use, the components in FIG. 13 that are surrounded by alternate long and short dash lines (the original image storage unit 110, the recording plane setting unit 120, the reference light setting unit 130, the observation region setting unit 140, and the pattern computation unit 150) can be realized by installing dedicated processing programs in one or a plurality of general-purpose computers 170. Likewise, the components in FIG. 14 that are surrounded by alternate long and short dash lines (the original image storage unit 110, the recording plane setting unit 120, the observation region setting unit 140 and the pattern computation unit 155) can also be realized by installing dedicated processing programs in one or a plurality of general-purpose computers 175.

What is claimed is:

1. A method for manufacturing a hologram recording medium that has an arrangement by which different original images are reproduced when observed from different positions, the hologram recording medium manufacturing method comprising:
    an original image preparation step of preparing a plurality N of original images, each as a set of unit light sources positioned in a three-dimensional coordinate system;
    a recording plane setting step of setting a predetermined recording plane in the three-dimensional coordinate system;
    an observation region setting step of setting a plurality N of observation regions in the three-dimensional coordinate system;
    a pattern computation step of computing a complex amplitude pattern formed on the recording plane by synthesis of object light components emitted from individual unit light sources from the set of unit light sources constituting the respective original images; and
    a pattern forming step of forming the complex amplitude pattern on a physical medium;
    wherein one-to-one correspondences are made between said plurality N of original images and said plurality N of observation regions, respectively; and
    wherein in the pattern computation step, a plurality of computation points being defined on said recording plane, at each of computation point positions, a synthetic object light is obtained by synthesizing object lights, emitted from the individual unit light sources constituting said plurality N of original images, which reach said each of computation point positions to compute a complex amplitude of said synthetic object light, wherein computations that each takes into account only light components, which, among the object light components from the unit light sources belonging to an i-th (original image, reach an i-th observation region corresponding to said i-th original image, are performed, wherein i=1, 2, ..., N.

2. The hologram recording medium manufacturing method according to claim 1, wherein in the pattern computation step, a plurality of computation points are defined discretely on the recording plane and an amplitude and a phase of a synthetic object light at a predetermined sampling time point is determined for each of computation point positions to determine the complex amplitude pattern as a discrete distribution of amplitudes and phases.

3. The hologram recording medium manufacturing method according to claim 2, wherein in the pattern forming step, a cell, formed of a three-dimensional structure, is positioned at each individual computation position and information of an amplitude and a phase concerning the computation point position corresponding to each individual cell are recorded in the three-dimensional structure of the cell.

4. The hologram recording medium manufacturing method according to claim 1, wherein
    in the original image preparation step, a plurality of original images that are positioned so as to partially overlap spatially are prepared.

5. The hologram recording medium manufacturing method according to claim 1, wherein
    in the observation region setting step, the plurality N of observation regions are set to be regions that are spatially exclusive with respect to each other.

6. The hologram recording medium manufacturing method according to claim 1, wherein in the observation region setting step, a portion or all of the plurality N of observation regions are set to be regions that partially overlap spatially with another observation region.

7. The hologram recording medium manufacturing method according to claim 1, wherein in the observation region setting step, a portion or all of the plurality N of observation regions are set to be regions that spatially match another observation region completely.

8. The hologram recording medium manufacturing method according to claim 1, wherein point light sources or collections of point light sources are used as the unit light sources, and the object light is defined as a spherical wave that is emitted radially from each point light source or as a synthetic wave of such spherical waves.

9. The hologram recording medium manufacturing method according to claim 1, wherein segment light sources are used as unit light sources, and object light components, each with a wavefront formed of a side surface of a cylindrical column having a segment light source as a central axis, which propagate in a direction perpendicular to the central axis, are defined.

10. The hologram recording medium manufacturing method according to claim 1, wherein in the observation region setting step, each individual observation region is set as a plane, a curved surface, or a three-dimensional body in the three-dimensional coordinate system.

11. The hologram recording medium manufacturing method according to claim 1, wherein in the pattern computation step, the computation is performed upon partitioning the three-dimensional space into a plurality M of plate-like spaces by slicing by a plurality of mutually parallel planes and by taking into account only light components, which, among the object light components from the unit light sources in a j-th plate-like space and belonging to an i-th original image, reach an i-th observation region and reach the recording plane only through an interior of the j-th plate-like space, wherein $i=1, 2, \ldots, N$, and $j=1, 2, \ldots, M$.

12. A method for manufacturing a hologram recording medium that has an arrangement by which different original images are reproduced when observed from different positions, the hologram recording medium manufacturing method comprising:
an original image preparation step of preparing a plurality of original images, each as a set of unit light sources positioned in a three-dimensional coordinate system;
a recording plane setting step of setting a predetermined recording plane in the three-dimensional coordinate system;
an observation region setting step of setting a plurality of observation regions in the three-dimensional coordinate system;
a pattern computation step of computing a complex amplitude pattern formed on the recording plane by synthesis of object light components emitted from individual unit light sources from the set of unit light sources constituting the respective original images; and
a pattern forming step of forming the complex amplitude pattern on a physical medium;
wherein one-to-one correspondences are made between said plurality of original images and said plurality of observation regions, respectively; and
wherein in the pattern computation step, a plurality of computation points being defined on said recording plane, at each of computation point positions, a synthetic object light is obtained by synthesizing object lights, emitted from the individual unit light sources constituting said plurality of original images, which reach said each of computation point positions to compute a complex amplitude of said synthetic object light, wherein computations that each takes into account only light components, which, among the object light components from the unit light sources, propagate toward a unique observation region set corresponding to an original image to which the unit light sources belong, are performed.

13. A hologram recording medium manufactured by the manufacturing method according to claim 1.

14. A device for manufacturing a hologram recording medium that has an arrangement by which different original images are reproduced when observed from different positions, the hologram recording medium manufacturing device comprising:
an original image storage unit, storing a plurality N of original images, each as data indicating a set of unit light sources positioned in a three-dimensional coordinate system;
a recording plane setting unit, setting a predetermined recording plane in the three-dimensional coordinate system;
an observation region setting unit, setting a plurality N of observation regions in the three-dimensional coordinate system;
a pattern computation unit, computing a complex amplitude pattern formed on the recording plane by synthesis of object light components emitted from individual unit light sources from the set of unit light sources constituting the respective original images; and
a pattern forming unit, forming the complex amplitude pattern on a physical medium;
wherein the observation region setting unit sets observation regions so that one-to-one correspondences are made between said plurality N of original images and said plurality N of observation regions, respectively; and
wherein the pattern computation unit defines a plurality of computation points on said recording plane and performs computations, at each of computation point positions, obtaining a synthetic object light by synthesizing object lights, emitted from the individual unit light sources constituting said plurality N of original images, which reach said each of computation point positions to compute a complex amplitude of said synthetic object light, wherein computations that each takes into account only light components, which, among the object light components emitted from the unit light sources belonging to an i-th original image, reach an i-th observation region corresponding to said i-th original image, wherein $i=1, 2, \ldots, N$.

* * * * *